July 5, 1927.
J. M. STRANG
1,634,695
EYEPIECE PRISM COMBINATION FOR USE IN RANGEFINDERS
OF THE SELF CONTAINED BASE TYPE
Filed Feb. 7, 1922    2 Sheets-Sheet 1
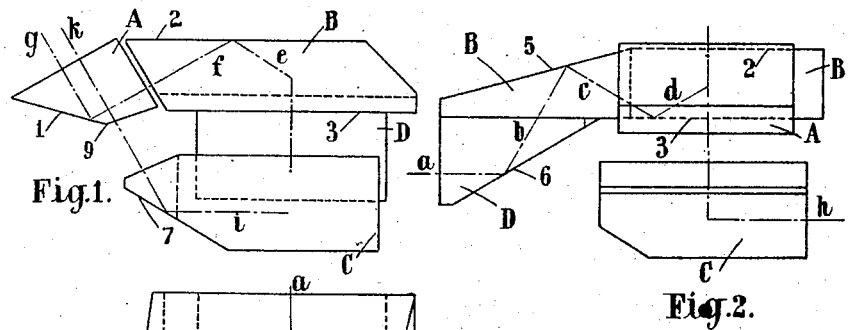
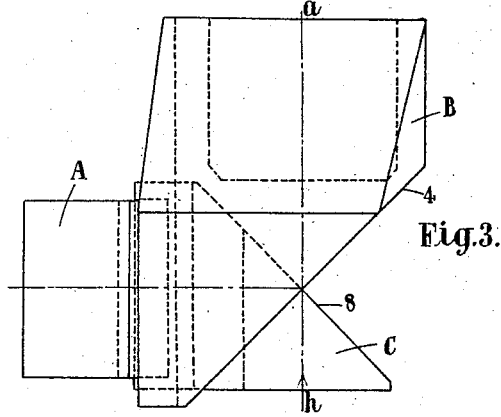
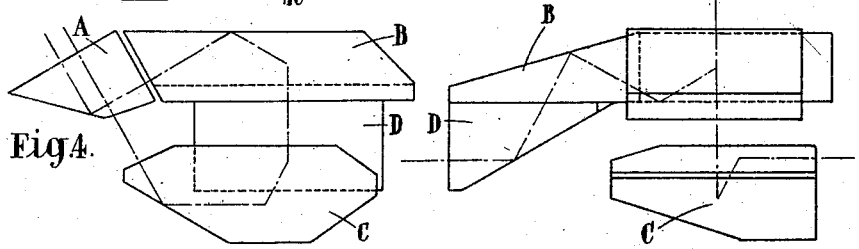
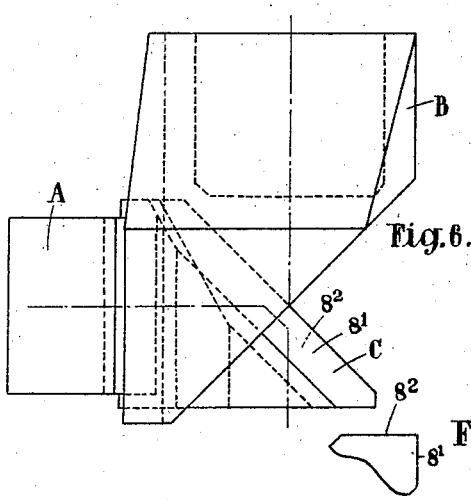
INVENTOR.
John Martin Strang
By J. Walter Fowler
Attorney.

July 5, 1927.  1,634,695
J. M. STRANG
EYEPIECE PRISM COMBINATION FOR USE IN RANGEFINDERS
OF THE SELF CONTAINED BASE TYPE
Filed Feb. 7, 1922  2 Sheets-Sheet 2

INVENTOR.
John Martin Strang.
By J. Walter Fowler
Attorney.

Patented July 5, 1927.

1,634,695

UNITED STATES PATENT OFFICE.

JOHN MARTIN STRANG, OF ANNIESLAND, GLASGOW, SCOTLAND, ASSIGNOR TO BARR AND STROUD, LIMITED, OF ANNIESLAND, GLASGOW, SCOTLAND.

EYEPIECE PRISM COMBINATION FOR USE IN RANGEFINDERS OF THE SELF-CONTAINED BASE TYPE.

Application filed February 7, 1922, Serial No. 534,746, and in Great Britain February 15, 1921.

This invention refers to eyepiece prism combinations for use in rangefinders of the self-contained base type comprising two telescope systems in which the rays of light coming from a distant object after passing through the respective telescope systems are combined to form two partial images of the object at or near a common focal plane by an "eyepiece prism combination," the two partial images being separated by a line of separation situated substantially in the focal plane.

According to this invention the beam of light from one (or in some cases both) of the telescope systems in the process of reflection which occurs in the eyepiece prism combination is reflected from three surfaces in succession two of which are parallel to each other and perpendicular to the third, these parallel surfaces being each contiguous to the said third surface and parallel or substantially parallel to the plane of triangulation, said third surface being perpendicular to the plane of triangulation and inclined at an angle of 45° to the base of the rangefinder. These three surfaces in the process of reflection divide the beam, reflect divided parts of the beam differently, in regard to order of reflection, and cause the parts reflected to unite and reform the beam. Thus, part of the beam may be reflected first from the perpendicular surface and then from the two parallel surfaces, while the remainder of the beam is reflected from one of the parallel surfaces first, then from the perpendicular surface, and then from the second parallel surface. In some cases two parts of the beam may be reflected as above, while a third part is reflected from both of the parallel surfaces before reflection at the perpendicular surface. In order to prevent splitting up of the image by this division of the beam and these different orders of reflection, it is essential that the two first-named reflecting surfaces should be parallel to each other and perpendicular to the third surface.

One of the advantages of this arrangement is that it reduces the amount of space required for the two total internal reflections in the prisms. The length of path of the rays in the glass of the prisms is thus reduced without the introduction of any silvered reflecting surfaces. Further, as the division of the reflection of the beam at the three surfaces mentioned can be varied according to the requirements, greater freedom is provided for the design of the prisms.

One method of carrying out this invention will now be described as applied to the case of a horizontal rangefinder having the eyepiece approximately in the middle of the base and the line of sight through the eyepiece inclined at an angle to the plane of triangulation. In this method the beam of light from one of the telescope systems is first reflected in a horizontal plane and at right angles to the base towards the eyepiece side of the instrument. It is subsequently reflected upwards towards the eyepiece from a surface inclined at a suitable angle to the plane of triangulation. If this angle is, for example 30°, the object will be viewed through the eyepiece at an angle of 60° to the horizontal. After this reflection the beam passes through the separating prism above the separating line without further reflection. This beam thus suffers one reflection in a vertical plane and one in a horizontal plane. If the end reflector is an optical square and the telescope system contains a single objective, the image formed by this beam will, therefore, be erect and in the correct sideways attitude.

The beam of light from the other telescope system is reflected in a vertical plane containing the base at two surfaces inclined to the horizontal and to each other so that the central part of the beam is thrown down at an angle on to the lower of two surfaces which are parallel to the plane of triangulation. After reflection at this horizontal surface, the central part of the beam is reflected at right angles to the base out towards the eyepiece side of the instrument by means of a vertical surface placed at 45° to the base. The central part of the beam is then reflected downwards by the second of the two parallel horizontal surfaces and passes into the separating prism whence it is reflected out to the eyepiece at the same angle as the beam from the other telescope. The parts of the beam on the right and left side of the centre follow the same course as the central part, except that the right part is reflected from the vertical surface before the two parallel horizontal surfaces, while the left part is reflected from the two parallel horizontal surfaces before the vertical surface. In this case the beam suffers five reflections in a vertical plane and one in a horizontal plane. Therefore, if the end reflector is an optical square and the telescope system contains a single objective, the image formed by this beam will be erect and in the correct attitude sideways.

The edge of the separating prism between the surface which reflects the second beam out towards the eyepiece and that through which the first beam is transmitted forms the line of separation between the partial images.

The arrangement described gives both partial images erect. If it is desired to invert one or both of the images, this can be accomplished in a number of well known ways. For example, the upper image can be inverted by making the reflection in a horizontal plane of the beam forming this image take place at a "roof" instead of a simple reflecting surface.

Some examples of construction will now be described with reference to the accompanying drawings, in which:—

Figure 1 is a side elevation, Figure 2 is a front elevation and Figure 3 is a plan showing an eyepiece prism combination in which the two parallel reflecting surfaces are contained in an upper prism.

Figures 4, 5 and 6 are corresponding views showing a similar arrangement but with roof faces on the bottom prism. Figure 7 is a sectional view showing the roof faces.

Figure 8:
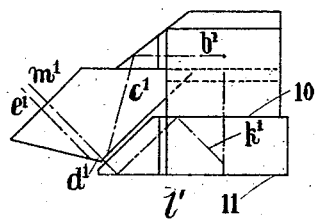
Figures 8, 9 and 10 are views corresponding to Figures 1, 2 and 3 showing an eyepiece prism combination in which the two parallel surfaces are contained in the bottom prism.

Referring to Figures 1, 2 and 3, the ray of light $h\ i\ k$ coming from the one telescope system and parallel to the base is reflected from the surface 8 of the lower prism C towards the eyepiece side of the instrument, the surface 8 being perpendicular to the plane of triangulation and inclined at 45° to the base. It is then reflected by the surface 7 at an angle to the horizontal plane passing through the separating prism A above the separating line 9. The surface of the separating prism A at which this beam enters may be termed the transmission surface. This ray is thus typical of those forming the upper image.

A typical ray forming the lower image is shown as $a\ b\ c\ d\ e\ f\ g$. This ray coming parallel to the base is reflected in a vertical plane first by the surface 6 of prism D and then by the surface 5 of prism B. From 5 it is thrown downwards on to the horizontal surface 3 of prism B from which it is reflected upwards to meet surface 4 which reflects it towards the eyepiece side of the instrument, the surface 4 being perpendicular to the plane of triangulation and inclined at 45° to the base. It then passes on to the second horizontal surface 2 from which it is reflected downwards into the separating prism A and reflected from the surface 1 out towards the eyepiece. The surface 4 is perpendicular to the surfaces 2 and 3.

A ray to one side of the ray $a\ g$ shown will be reflected from 5 on to the face 4 and from that to the parallel surfaces 3 and 2, while a ray on the other side of the ray $a\ g$ will be reflected from the two parallel surfaces 3 and 2 before it is reflected from the surface 4. As the surfaces 2 and 3 are parallel to each other and perpendicular to the surface 4 no splitting up of the image occurs due to the different paths taken by the several rays. In this combination the ray $a\ g$ forming the lower image thus suffers five reflections in a vertical plane and one in a horizontal plane. Therefore, if the end reflector of the instrument is a non-inverting optical square and the telescope system contains a single objective the image formed by this beam will be erect and in the correct attitude sideways.

The ray $h\ i\ k$ forming the upper image suffers one reflection in a vertical plane and one in a horizontal plane. Therefore if the end reflector is a non-inverting optical square and the telescope system contains a single objective, the image formed by this beam will be erect and in the correct sideways attitude.

In Figures 4, 5, 6 and 7, the rays forming the lower image are similar to those in Figures 1, 2 and 3, but the rays forming the upper image suffer an extra reflection in a vertical plane at the roof faces $8^1$ and $8^2$ of the prism C. By this means an inverted image is formed in the upper field.

Figure 9:
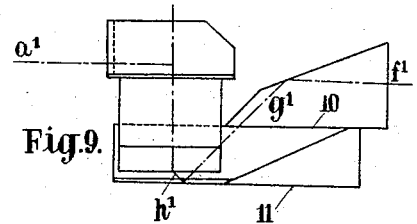
Figure 10:
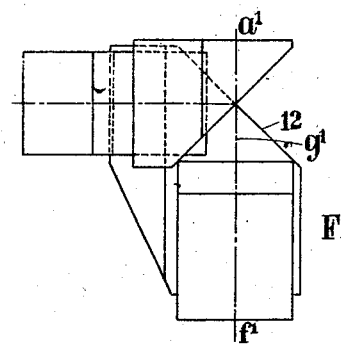

In Figures 8, 9 and 10, the ray $a^1\ b^1\ c^1\ d^1\ e^1$ forming the lower image suffers three reflections in a vertical plane and one in a horizontal plane. For the type of instrument described above the image would therefore be erect.

The ray $f^1\ g^1\ h^1\ k^1\ l^1\ m^1$ forming the upper image suffers four reflections in a vertical plane and one in a horizontal plane. The image would therefore be inverted.

In this case the two surfaces 10 and 11 are parallel to each other and perpendicular to the surface 12, the surface 12 being perpendicular to the plane of triangulation and inclined at 45° to the base. The rays forming the image in the upper field may therefore be divided over these three reflecting surfaces 10, 11 and 12 in the different ways described above for Figures 1, 2 and 3.

Figure 11:
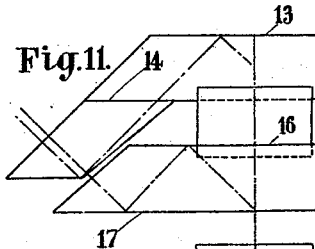
Figures 11, 12 and 13 are corresponding views showing a combination in which two parallel surfaces occur in both beams.
Figure 12:
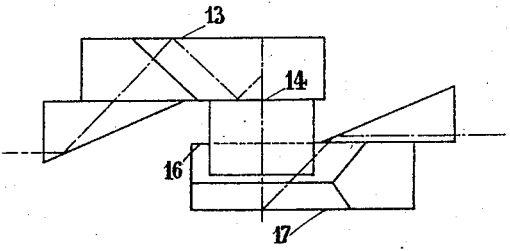
Figure 13:
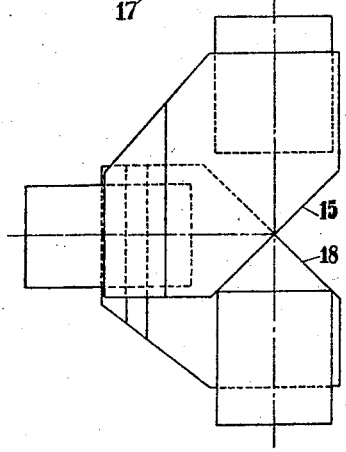

In Figures 11, 12 and 13, the surfaces 13 and 14 are parallel to each other and perpendicular to 15, while the surfaces 16 and 17 are parallel to each other and perpendicular to 18. The surfaces 15 and 18 are each perpendicular to the plane of triangulation and inclined at 45° to the base. In this case therefore the rays forming both images in the field of view may be divided over the three reflecting surfaces in the manner described for Figures 1, 2 and 3. In this case the lower image will be erect and the upper image inverted.

I claim:—

1. An eyepiece prism combination for use in rangefinders of the self-contained base type having, for the reflection of the beam of light from one of the telescope systems, reflecting surfaces, two of which are parallel to each other, substantially parallel to the plane of triangulation, and perpendicular to a third surface, these parallel surfaces being each contiguous to the said third surface, said third surface being perpendicular to the plane of triangulation and inclined at an angle of 45° to the base of the rangefinder, said three surfaces in the process of reflection operating to divide the beam, to reflect divided parts of the beam differently, in regard to order of reflection, and to cause the parts reflected to unite and reform the beam for the purposes set forth.

2. An eyepiece prism combination for use in rangefinders of the self-contained base type having for the reflection of the beams of light from the telescope systems two groups of surfaces, one group for each beam, the surfaces in each group comprising two which are parallel to each other, substantially parallel to the plane of triangulation, and perpendicular to a third surface, these parallel surfaces being each contiguous to the said third surface, said third surface being perpendicular to the plane of triangulation and inclined at an angle of 45° to the base of the rangefinder, said three surfaces in the process of reflection operating to divide the beam, to reflect divided parts of the beam differently, in regard to order of reflection, and to cause the parts reflected to unite and reform the beam.

3. An eyepiece prism combination for use in rangefinders of the self-contained base type having, for the reflection of the beam of light from one of the telescope systems, reflecting surfaces, two of which are parallel to each other, substantially parallel to the plane of triangulation, and perpendicular to a third surface, these parallel surfaces being each contiguous to the said third surface, said third surface being perpendicular to the plane of triangulation and inclined at an angle of 45° to the base of the rangefinder, said three surfaces in the process of reflection operating to divide the beam, to reflect divided parts of the beam differently, in regard to order of reflection, and to cause the parts reflected to unite and reform the beam, the combination comprising a separating prism having a transmission surface and a reflecting surface which intersect and a line of separation formed by the intersection of the transmission and reflecting surfaces, for the purposes set forth.

4. An eyepiece prism combination for use in rangefinders of the self-contained base type having, for the reflection of the beam of light from one of the telescope systems, reflecting surfaces two of which are parallel to each other, substantially parallel to the plane of triangulation, and perpendicular to a third surface, these parallel surfaces being each contiguous to the said third surface, said third surface being perpendicular to the plane of triangulation and inclined at an angle of 45° to the base of the rangefinder, said three surfaces in the process of reflection operating to divide the beam, to reflect divided parts of the beam differently, in regard to order of reflection, and to cause the parts reflected to unite and reform the beam, the combination comprising a separating prism having an incident face and a reflecting surface which intersect and a line of separation formed by the intersection of incident and reflecting surface, for the purposes set forth.

5. An eyepiece prism combination for use in rangefinders of the self-contained base type having for the reflection of the beam of light from one of the telescope systems six reflecting surfaces, two of which are parallel to each other, substantially parallel to the plane of triangulation, and perpendicular to a third surface, these parallel surfaces being contiguous to the said third surface, said third surface being perpendicular to the plane of triangulation and inclined at an angle of 45° to the base of the rangefinder, said two parallel and perpendicular surfaces in the process of reflection operating to divide the beam, to reflect divided parts of the beam differently, in regard to order of reflection, and to cause the parts reflected to unite and reform the beam, for the purposes set forth.

6. An eyepiece prism combination for use in rangefinders of the self-contained base type having for the reflection of the beam of light from one of the telescope systems six reflecting surfaces two of which are parallel to each other, substantially parallel to the plane of triangulation, and perpendicular to a third surface, these parallel surfaces being contiguous to the said third surface, said third surface being perpendicular to the plane of triangulation and inclined at an angle of 45° to the base of the rangefinder, said two parallel and perpendicular surfaces in the process of reflection operating to divide the beam, to reflect divided parts of the beam differently, in regard to order of reflection, and to cause the parts reflected to unite and reform the beam, and for the reflection of the beam from the other telescope system, two reflecting surfaces, for the purposes set forth.

JOHN MARTIN STRANG.